United States Patent [19]

Furuya et al.

[11] Patent Number: 4,860,860
[45] Date of Patent: Aug. 29, 1989

[54] AUTOMATIC TRANSMISSION CASING WITH SERVOMOTOR AND ANCHOR PIN INSTALLED IN UPPER SIDE OF CASING

[75] Inventors: Osamu Furuya, Isehara; Hiromi Taguchi, Zama, both of Japan

[73] Assignee: Nissan Motor Co., Ltd., Yokohama, Japan

[21] Appl. No.: 264,719

[22] Filed: Oct. 31, 1988

[30] Foreign Application Priority Data

Oct. 30, 1987 [JP] Japan .................................. 62-273228

[51] Int. Cl.$^4$ ............................................. F16D 51/00
[52] U.S. Cl. ................................ 188/77 R; 74/606 R; 188/249; 188/259
[58] Field of Search ................... 188/77 R, 77 W, 249, 188/259; 74/606 R

[56] References Cited

U.S. PATENT DOCUMENTS

| | | | |
|---|---|---|---|
| 2,513,192 | 6/1950 | McFarland | 188/77 R X |
| 2,638,185 | 5/1953 | Carnagua et al. | 188/77 R X |
| 2,694,948 | 11/1954 | McFarland | 188/77 R X |
| 2,701,630 | 2/1955 | Horton et al. | 188/77 R X |
| 2,720,124 | 10/1955 | Polomski | 74/732 |
| 2,901,888 | 9/1959 | Swift | 188/77 R X |
| 3,003,367 | 10/1961 | Winchell | 188/77 W X |
| 3,004,390 | 10/1961 | Duffy | 188/77 R X |
| 3,038,353 | 6/1962 | Roche | 74/606 X |
| 3,353,637 | 11/1967 | Chana | 188/77 R X |
| 3,386,535 | 6/1968 | Bishop et al. | 188/259 X |
| 3,557,911 | 1/1971 | Ellard | 188/77 R |
| 3,613,481 | 10/1971 | Lapinski | 74/606 R X |
| 3,869,785 | 3/1975 | Victory | 188/77 W X |
| 4,034,625 | 7/1977 | Taintor | 74/752 C |
| 4,088,044 | 5/1978 | Taintor | 74/765 |
| 4,388,986 | 6/1983 | Umezawa | 188/77 R |
| 4,456,100 | 6/1984 | Manaki | 188/77 R |
| 4,602,706 | 7/1986 | Blinks et al. | 188/259 |
| 4,604,914 | 8/1986 | Fisher | 188/77 R X |
| 4,693,141 | 9/1987 | Iwanaga | 74/606 R |

Primary Examiner—Douglas C. Butler
Attorney, Agent, or Firm—Foley & Lardner, Schwartz, Jeffery, Schwaab, Mack, Blumenthal & Evans

[57] ABSTRACT

A casing receiving therein a power transmitting mechanism has opposed upper and lower side portions. A control valve for controlling a gear shift of a transmission is installed in the lower side portion of the casing. A band brake includes a brake band, a servomotor operatively connected to the control valve and one end of the brake band for selectively putting the brake band into a brake engaged state and a brake disengaged state and an anchor pin operatively connected to the other end of the brake band for receiving a reaction force therefrom. The servomotor and the anchor pin are installed in the upper side portion of the casing.

8 Claims, 4 Drawing Sheets

AUTOMATIC TRANSMISSION CASING WITH SERVOMOTOR AND ANCHOR PIN INSTALLED IN UPPER SIDE OF CASING

BACKGROUND OF THE INVENTION

1. Field of the Invention

The present invention relates to automatic transmissions for automotive vehicles and more particularly to improvements in or relating to an arrangement of a band brake, a servomotor therefor, a control valve, etc. of an automatic transmission.

2. Description of the Prior Art

In one type of a prior art automatic transmission, a control valve for a gear shift control is installed in a lower side portion of a casing, in which casing a power transmitting mechanism consisting of planetary gear sets, clutches, band brakes, etc. is accomodated. A fluid pressure actuated piston of a servomotor for control of a band brake is also installed in the lower side portion of the casing. In another type of a prior art automatic transmission, the control valve and the servomotor piston are installed in the upper side portion of the casing.

In the prior art transmissions, an anchor pin is installed in the casing on the opposite side to the servomotor piston, i.e., the anchor pin is installed is the place where a circular sectional casing portion and a horizontal casing portion are joined to form a sharp angled recession, in which circular casing portion and horizontal casing portion the power transmitting mechanism and the control valve are respectively installed. Due to this, the work for adjustment of the clearance between the brake band and the brake drum through adjustment of the axial position of the anchor pin relative to the casing cannot be done with ease and efficiency. This is particularly true when the transmission is installed on the vehicle body since it becomes difficult for the operator not only to observe the anchor pin but to handle tools in a limited space.

In the above described prior art transmissions, the control valve and servomotor piston are arranged adjacent each other, i.e., arranged in the same side portion of the casing. Due to this, it is required to enlarge a particular casing portion so as to attain a space for installation of both the servomotor piston and the control valve. This causes increase in size of the transmission and restrictions in arrangement of the hydraulic circuit. In order to solve this problem, it is considered to arrange the control valve and servomotor piston in such a way as to be spaced vertically from each other. However, when this is the case, the prior art transmission of the first mentioned type is required to expand downwardly, thus reducing the ground clearance of the transmission. In case of the prior art transmission of the second mentioned type, the transmission expands upwardly, thus reducing the effective volume of the engine compartment.

SUMMARY OF THE INVENTION

In accordance with the present invention, there is provided an automatic transmission which comprises a casing receiving therein a power transmitting mechanism and having opposed upper and lower side portions, a control valve installed in the lower side portion of the casing and a band brake for controlling the operation of the power transmitting mechanism, having a brake band, a servomotor operatively connected to the control valve and one end of the brake band for selectively putting the brake band into a brake engaged state and a brake disengaged state and an anchor pin operatively connected to the other end of the brake band for supporting a reaction force therefrom. The servomotor and the anchor pin are installed in the upper side portion of the casing.

The above arrangement is effective for solving the above noted problem inherent in the prior art automatic transmission.

It is accordingly an object of the present invention to provide an improved automatic transmission which makes it possible to attain adjustment of a band brake with ease and efficiency.

It is another object of the present invention to provide an improved automatic transmission of the above described character which can reduce the design restrictions thereof and of the adjacent parts, assemblies, wirings, etc.

It is a further object of the present invention to provide an improved automatic transmission of the above described character which can improve the responsiveness thereof.

It is a further object of the present invention to provide an improved automatic transmission of the above described character which can reduce the possibility of being damaged by the foreign matters contained in oil.

DESCRIPTION OF THE PREFERRED EMBODIMENTS

Figure 1:
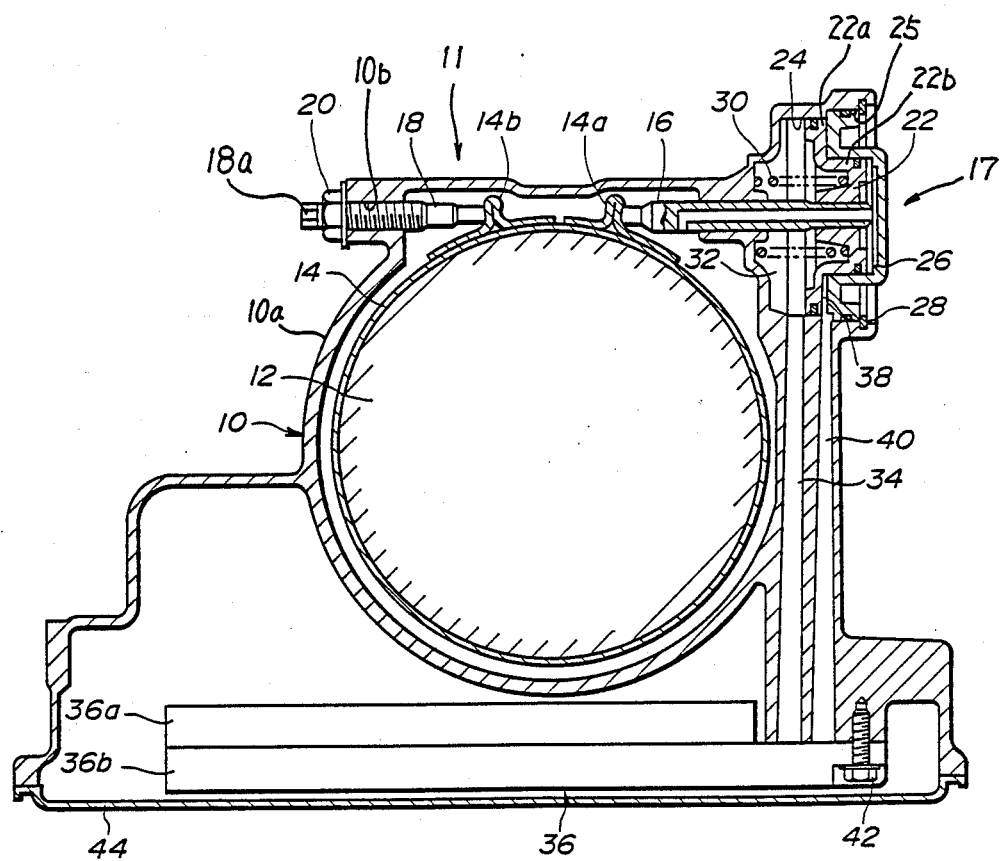
FIG. 1 is a sectional view of a principal portion of an automatic transmission embodying the present invention.

Referring to FIG. 1, a casing 10 has a circular sectional portion 10a in which a band brake 11 constituting part of a power transmitting mechanism is installed. The band brake 11 includes a brake drum 12 and a brake band 14 wound or placed around the brake drum 12. A piston stem 16 constituting part of a servomotor 17 is pressed against an end 14a of the brake band 14. The other end 14b of the brake band 14 is pressed against an anchor pin 18 of the band brake 11 to be held stationarily thereby. The anchor pin 18 is partly threaded and screwed into a correspondingly threaded hole 10b of the casing 10. The anchor pin 18 has an outer end portion 18a projecting outwardly of the casing 10. A lock nut 20 is screwed onto the outer end portion 18a of the anchor pin 18 so that the anchor pin 18 is releasably locked in a desired axial position relative to the threaded hole 10b.

The piston stem 16 is connected with a fluid pressure actuated piston 22 of the servomotor 17. The servomotor piston 22 is of a stepped configuration and has a larger diameter portion 22a disposed in a hole 24 formed in the casing 10 and a smaller diameter portion 22b received by a retainer 26. The retainer 26 is in turn installed in a hole 25 formed in the casing 10 and prevented by a snap ring 28 from being slipped off from the hole 25. The servomotor piston 22 is urged by a spring 30 in the returning or withdrawal direction. A servo releasing chamber 32 is formed on one side of the larger diameter portion 22a of the the servo piston 22 and connected to a control valve 36 through a vertical conduit 34 formed in the side wall of the casing 10. A servo applying chamber 38 is formed on the other side of the larger diamter portion 22a and connected to the control valve 36 through a vertical conduit 40 formed in the side wall of the casing 10. The casing 10 is a casting, i.e., formed by casting, and the conduits 34 and 40 are formed at the time of casting of the casing 10. The servomotor 17 is constituted by the piston stem 16, piston 22, holes 24 and 25, retainer 26, snap ring 28, spring 30, servo releasing chamber 32 and the servo applying chamber 38.

The control valve 36 is secured to the lower side of the casing 10 with a number of bolts 42 and consists of an upper body 36a and a lower body 36b. A number of valve pistons (not shown) are accomodated in the upper and lower bodies 36a and 36b. The lower end of the casing 10 is sealingly closed by an oil pan 44.

The control valve 36 controls the operations of clutches and brakes constituting the power transmitting mechanism by the actions of the control pistons included therein. When the brake band 14 is engaged to stop rotation of the brake drum 12, fluid pressure is supplied to the servo applying chamber 38 through the conduit 40 and at the same time the servo releasing chamber 32 is drained through the conduit 34. By this, the servomotor piston 22 is subjected to a force directed in the left-hand direction in FIG. 1, pressing the brake band 14 against the outer circumference of the brake drum 12 and thereby effecting a braking action. The anchor pin 18 supports the reaction force from the brake band 14. On the contrary, when the brake band 14 is to be disengaged, the servo applying chamber 38 is drained and at the same time fluid pressure is supplied to the servo releasing chamber 32.

The band brake 13 needs to be adjusted so that the brake band 12 can apply a predetermined friction force when the servomotor piston 22 strokes a predetermined amount. The adjustment of the band brake 13 is made as follows. Firstly, the adjusting nut 20 is loosened and then the anchor pin 18 is driven into the casing 10. By this, the end 14b of the brake band 14 is pushed and moved toward a position where it is engaged with the brake drum 12. When the brake band 14 is put into an engaged condition, it becomes impossible to drive the anchor pin 18 further. Under this condition, the anchor pin 18 is reversely driven by a predetermined number of turns and thereafter the adjusting nut 20 is tightened to lock the anchor pin 18. By this, a predetermined clearance is created between the brake band 14 and the brake drum 12.

In the foregoing, it is to be noted that the above described adjusting work for adjustment of the band brake 13 can be made with ease and efficiency because the anchor pin 18 and the adjusting nut 20 are installed in the upper side portion of the casing 10 and therefore it becomes possible to handle the anchor pin 18 and adjusting nut 20 with ease even when the automatic transmission is installed on the vehicle body.

It is further to be noted that the control valve 36 can be arranged so as to extend throughout the lower side of the casing 10, thus attaining a well-balanced arrangement. This is because there is no necessity of retaining a space for disposition of the servomotor piston 22 on the lower side of the casing 10. By this, design restrictions in arrangement of the valve pistons within the control valve 36 and connections of the conduits thereof can be reduced.

It is further to be noted that the distance between the center of the power transmitting mechanism (i.e., the center of the brake drum 12) and the oil pan 44 is equal to the sum of the radius of the power transmitting mechanism, the thickness of the control valve 36 and some allowance, which is a minimum possible value. By this, it becomes possible to increase the ground clearance of the automatic transmission.

It is further to be noted that the control valve 36 is accomodated in the lower side portion of the casing 10, whereby design restrictions of the transmission and its adjacent parts, assemblies, wirings, etc. can be reduced. That is, in case the control valve 36 is disposed in the upper side portion of the casing 10, a largely projected portion is formed on the upper side of the casing 10, thus causing a possibility that the projected portion interferes with other parts, assemblies, wirings, etc. disposed within the engine compartment. In this comparison, the automatic transmission of this invention is constructed so that the control valve 36 is disposed in the lower side portion of the casing 10, thus being free from this problem.

It is further to be noted that the conduits 40 and 34 for supplying fluid pressure to the servo applying chamber 38 and the servo releasing chamber 32 are arranged so as to extend vertically, whereby it becomes possible to draw off fluid or oil from the servo applying chamber 38 and the servo releasing chamber 32 rapidly and therefore it becomes possible to control the operation of the hydraulic piston 22 with a good responsiveness.

It is further to be noted that foreign matters such as iron powder or the like having entered the servo applying chamber 38 and the servo releasing chamber 32 can fall by its own weight through the conduits 40 and 34 to go out therefrom easily, thus reducing the possibilty of damage of the sliding portion of the piston 22.

Figure 2:
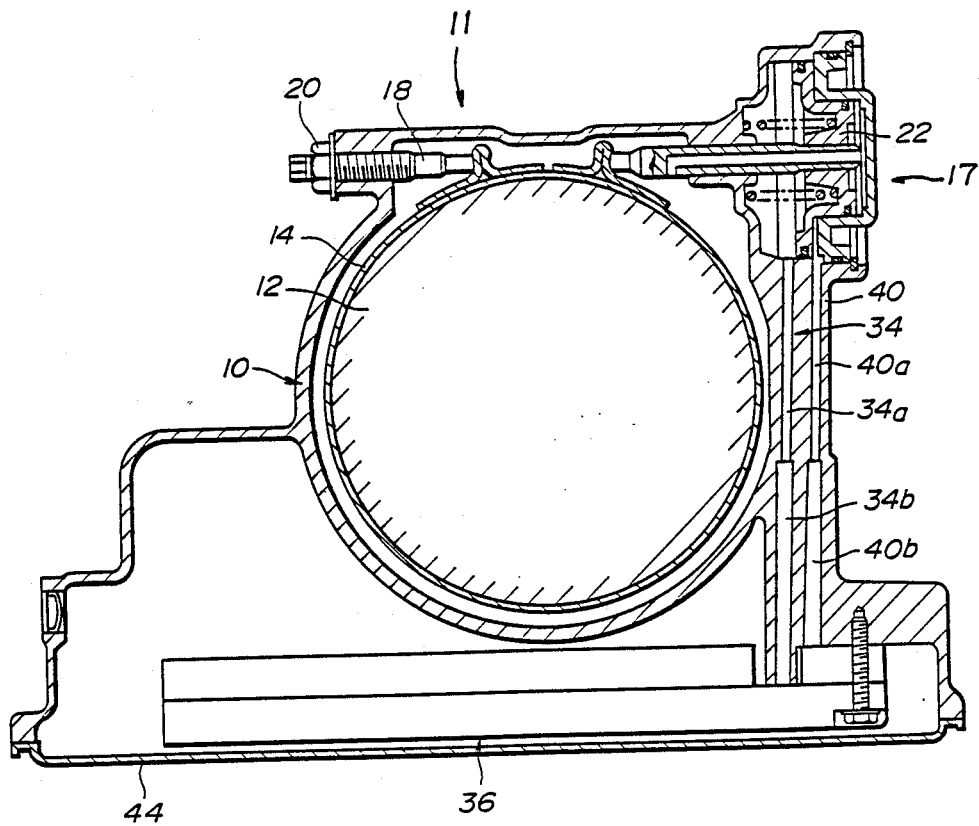
FIGS. 2 to 4 are views similar to FIG. 1 but showing other embodiments of the present invention.

FIG. 2 shows another embodiment which is substantially similar to the previous embodiment except that the upper side portions 34a and 40a of the conduits 34 and 40 are holes which are formed by machining and only the lower side portions 34b and 40b are formed at the time of casting of the casing 10. This embodiment makes it possible to reduce the bore size of the lower side conduit portions 34b and 40b, whereby it become possible to connect the control valve 36 with the conduits 34 and 40 more efficiently.

Figure 3:
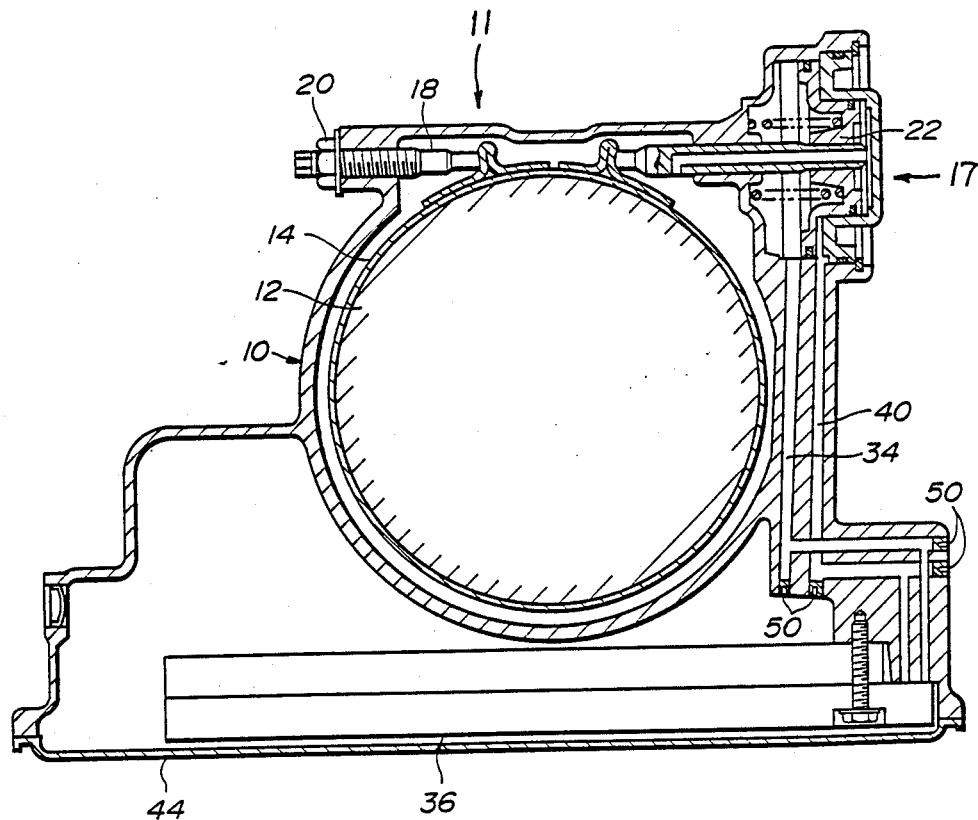

FIG. 3 shows a further emobidment which is substantially similar to the previous embodiment of FIG. 1 except that the conduits 34 and 40 are formed into a crank-like shape or double-bent shape for thereby changing the place where they are joined with the control valve 36. Unnecessary open ends of the conduits 34 and 40 are sealingly closed by plugs 50.

Figure 4:
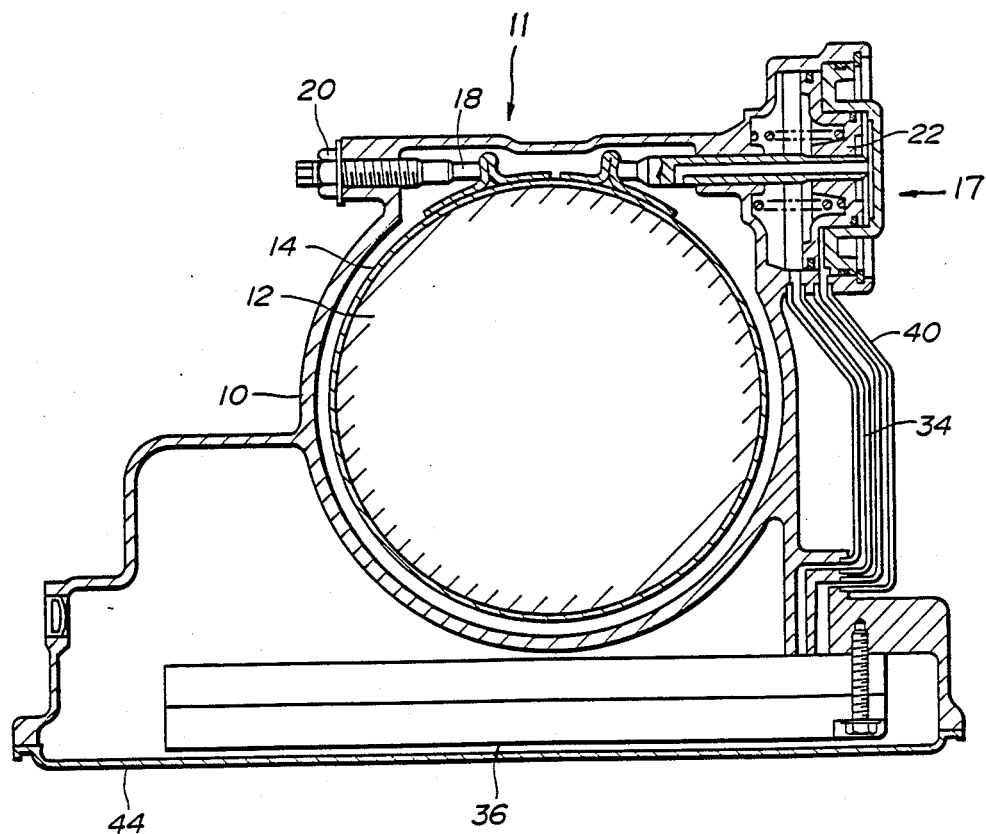

FIG. 4 shows a further embodiment which is substantially similar to the previous embodiment of FIG. 1 except that part of the conduits 34 and 40 are constituted by independent pipes or tubes. By this embodiment, a portion of the casing 10 otherwise necessitated for provision of the omitted part of the conduits 34 and 40 is unnecessitated, thus making it possible to reduce the weight of the casing 10.

What is claimed is:

1. An automatic transmission comprises:
   a casing receiving therein a power transmitting mechanism and having opposed upper and lower side portions;
   a control valve installed in said lower side portion of said casing; and a band brake for controlling the operation of said power transmitting mechanism, having a brake band, a servomotor operatively connected to said control valve and one end of said brake band for selectively putting said brake band into a brake engaged state and a brake disengaged state and an anchor pin operatively connected to the other end of said brake band for supporting a reaction, force therefrom;

said servomotor and said anchor pin being installed in said upper side portion of said casing.

2. An automatic transmission comprises:

a casing receiving therein a power transmitting mechanism and having opposed upper and lower side portions;

a control valve installed in said lower side portion of said casing; and a band brake for controlling the operation of said power transmitting mechanism, having a brake band, a fluid pressure actuated piston operatively connected to said control valve and one end of said brake band and movable between a brake engaging position and a brake disengaging position and an anchor pin operatively connected to the other end of said brake band for supporting a reaction force therefrom;

said fluid pressure actuated piston and said anchor pin being installed in said upper side portion of said casing.

3. An automatic transmission as set forth in claim 2 wherein said anchor pin is adjustable in its axial position relative to said casing and locked in a desired position by a lock nut.

4. An automatic transmission as set forth in claim 3 wherein said fluid actuated piston is fluidly connected on the opposed sides thereof to said control valve through a pair of conduits which are formed in a side wall of said casing in such a way as to extend substantially vertically.

5. An automatic transmission as set forth in claim 4 wherein said casing is a casting and said conduits are entirely formed at the time of casting of said casing.

6. An automatic transmission as set forth in claim 4 wherein said conduits have lower side portions which are formed at the time of casting of said casing and remaining upper side portions which are formed by machining after the casting of said casing.

7. An automatic transmission as set forth in claim 4 wherein said conduits are formed into a crank-like shape.

8. An automatic transmission as set forth in claim 4 wherein said conduits are partly formed by independent pipes.

* * * * *